United States Patent [19]
Hall

[11] Patent Number: 5,949,535
[45] Date of Patent: Sep. 7, 1999

[54] PROTECTIVE RATING SYSTEM FOR EYEWEAR

[76] Inventor: Gary W. Hall, 6326 N. 38$^{th}$ St., Paradise Valley, Ariz. 85253

[21] Appl. No.: 09/048,406

[22] Filed: Mar. 26, 1998

[51] Int. Cl.$^6$ ..................................................... G01B 9/00
[52] U.S. Cl. ............................................... 356/124; 351/44
[58] Field of Search .................... 356/124–127; 351/162, 160 R, 44, 47–49, 163; 427/157, 164; 250/482.1, 472.1, 473.1

[56] References Cited

U.S. PATENT DOCUMENTS

| | | | |
|---|---|---|---|
| 4,194,814 | 3/1980 | Fischer et al. | 351/160 R |
| 4,219,721 | 8/1980 | Kamen et al. | 219/121 LM |
| 4,329,378 | 5/1982 | Tarumi et al. | 351/51 |
| 4,878,748 | 11/1989 | Johansen et al. | 351/44 |
| 5,016,292 | 5/1991 | Rademacher | 2/431 |

OTHER PUBLICATIONS

Sliney; UV radation ocular exposure dosimetry; 1995; 72, 74, 75; Journal of Photochemistry and Photobiology B: Biology.

Rosenthal et al.; The Ocular Dose of Ultraviolet Radiation from Sunlight Exposure; 1985; 167; Photochemistry and Photobiology.

ANSI; Nonperscription Sunglasses and Fashion Eyewear–Requirements; 1986; American National Standard for Ophthalmics.

Ham et al.; Retinal sensitivity to damage from short wavelength light; 1976; background material; Nature.

Rosenthal, et al.; The effect of Sunglasses on Ocular Exposure to Ultraviolet Radiation; 1988; 72–74; American Journal of Public Health.

Young; The Family of Sunlight–Related Eye Diseases; 1994, Background materials; Optometry and Vision Science.

*Primary Examiner*—Hoa Q. Pham
*Attorney, Agent, or Firm*—Halvorson & Venable, P.C.

[57] ABSTRACT

The present invention is a method of rating eyewear according to their solar radiation protective capabilities. Measured ultraviolet (UV), blue light (BLUE), and reflective and blocking properties (STYLE) of eyewear are transformed into a substantially linear numerical value. The ultraviolet and blue light values provide information about the absorptive properties of eyewear lenses. The UV and BLUE values provide information about the absorptive properties of the lenses while style provides information about the light blocking properties of the frames. These values are then placed upon rated eyewear, thus allowing consumers the ability to make more informed decisions when shopping for protective eyewear.

14 Claims, 2 Drawing Sheets

Sunglass Protection Factors (SPF)

| UV | BLUE | STYLE |
|---|---|---|
| 99 | 76 | 72 |

Figure 1

Eye Protection Factors (EPF)

| UV | BLUE |
|---|---|
| 99 | 76 |

Figure 2

Eye Protection Rating (EPR)

| UV | STYLE |
|----|-------|
| 99 | 72    |

Figure 3

Eye Protection Factors (EPF)

| BLUE | STYLE |
|------|-------|
| 76   | 72    |

Figure 4

PROTECTIVE RATING SYSTEM FOR EYEWEAR

FIELD OF THE INVENTION

The present invention relates to the field of eye protection. More particularly, the present invention is a method of rating sunglasses designed to inform the purchasers of the light protective properties of the sunglasses.

BACKGROUND

Worldwide there has been an alarming increase in the incidence of skin cancer occurring over the past two decades, particularly in the populated Sunbelt regions. This near epidemic of skin cancer has resulted in many organizations, including the National Skin Cancer Foundation, heightening public awareness of the problem of solar radiation, and encouraging preventative measures. One of the most notable preventative changes that has occurred in the world has been the development of the sun protection factor (SPF) which provides rating for sun protection given to various sun screen products. The SPF system for sunscreens is based on units of time required for a given skin type to reach erythema condition under selected radiation exposure and ranges from 0 to 50 with increasing protection.

Other than the skin, the only other human organ directly exposed to sunlight is the eye. Although other parts of our body, including the immune system, may be adversely affected by sunlight, damage to the eye from certain wavelengths of sunlight is now well documented. Examples of such damage include cataract, pterygium, keratitis (snow blindness) and possibly macular degeneration. Since virtually all traditional sunscreens are toxic to the cornea and would interfere with vision, the typical method of sun protection for the eye, beyond normal anatomical and physiological protection, has been the use of sunglasses.

The spectrum of solar radiation incident on the earth's surface extends from 290 nm to 23 um. Wavelengths between approximately 400 and 1400 nm are transmitted by the ocular lens to the retina. The ocular lens of the human eye absorbs wavelengths below 400 nm. Consequently, the lens provides the primary protection for the retina from the hazardous effects of short-wavelength radiation.

The damaging effect of radiant energy upon the eye is dependent upon the wavelength or energy content of the photons. Long wavelength radiation, in the near infrared, is relatively harmless, whereas shorter wavelength radiation, in the near ultraviolet, is very damaging. For example, there is approximately 3000 times more energy required at 1064 nm than at 350 nm to produce a retinal lesion of equal severity.

Within the visible range (400–700 nm), the damaging, or toxic effects, of radiation increase progressively as photon energy rises, but not in a simple, linear manner. However, there is a sudden rise in the amount of damage produced in the retina when the photon energy reaches a wavelength of approximately 510 nm. This is followed by a precipitous increase in the severity of deleterious effects through the remainder of the visible part of the spectrum and continuing into the ultraviolet. The high-energy segment of the visible region (400 to 500 nm) is more hazardous to the retina than the low-energy portion (500 to 700 nm). Moreover, because this increased toxicity occurs at the border between the perceived colors of green and blue, the phenomenon is referred to as the blue-light hazard.

Ultraviolet (UV) radiation comprises invisible high-energy rays from the sun that lie just beyond the violet/blue end of the visible spectrum. Although more than 99% of UV radiation is absorbed by the lens of the eye, a portion reaches the light-sensitive retina. The UV radiation present in sunlight is not useful for vision. There are good scientific studies that support that UV absorption by the eye contributes to age-related changes in the eye and a number of serious eye diseases.

Ultraviolet radiation in sunlight is commonly divided into three components: UV-A (315 to 400 nm) radiation that causes tanning but is also thought to contribute to aging of the skin and skin cancer; UV-B (280 to 315 nm) radiation that can cause sunburn and predispose to skin cancer;; and, UV-C (110 to 280 nm) radiation that is nearly completely absorbed by the ozone layer before reaching the Earth's surface. UV radiation plays a role in the development of various ocular disorders including age-related cataract, pterygium, cancer of the skin around the eye, photokeratitis and corneal degenerative changes, and may contribute to age-related macular degeneration.

Clinical experience, evidence from accidental exposures, and other experimental studies show that UV-B is more damaging to the eye, presumably because it has higher energy than UV-A. The cornea and lens of the eye absorb most of the UV-B; therefore it can cause damage to these tissues but will not normally damage the retina. However, the retina, if exposed to UV-B radiation, can be damaged. UV-A radiation has lower energy than UV-B and penetrates much deeper into the eye to cause injury to the retina and lens. Neither UV-B nor UV-A has been shown to be beneficial to the eye.

Cataracts are a major cause of visual impairment and blindness worldwide. Cataracts are a cloudiness of the lens inside the eye that occurs over a period of many years. Laboratory studies have implicated UV radiation as a causal factor for cataract. Furthermore, epidemiological studies have shown that certain types of cataracts are associated with a history of increased UV radiation exposure.

Age-related macular degeneration is the major cause of reduced vision in the United States for people over age 55. Exposure to UV and intense violet/blue visible radiation is damaging to retinal tissue in laboratory experiments; thus scientists have speculated that chronic UV or intense violet/blue light exposure may contribute to the aging processes in the retina.

Pterygium is a growth of tissue on the conjunctiva of the eye that may extend onto the clear cornea where it can block vision. It is seen most commonly in people who work outdoors in the sun and wind, and its prevalence is related to the amount of UV exposure. It can be removed surgically, but often recurs, and can cause cosmetic concerns and visual loss if untreated.

Photokerititis is essentially reversible sunburn of the cornea resulting from excessive UV-B exposure. It occurs when someone spends long hours on the beach or in the snow without eye protection. It can be extremely painful for 1–2 days and can result in temporary loss of vision. There is some indication that long-term exposure to UV-B can result in corneal degenerative changes.

Children are not immune to the risk of ocular damage from UV radiation. They typically spend more time outdoors in the sunlight than adults do. Also, in young children, transmittance to the retina is greater because much less light is absorbed by the lens. Solar radiation damage to the eye appears to be cumulative and increases the risk of developing an ocular disorder later in life. Therefore, it is prudent to protect the eyes of children against UV radiation by wearing a brimmed hat or cap and sunglasses.

The use of glasses with absorptive properties when the eyes are exposed to intense sunlight represents a simple, safe, practical, inexpensive, and prudent measure designed to prevent unnecessary radiation damage to ocular tissues. Reducing damage to the outer layers of the center of the retina should slow the rate of deterioration and retard the beginning of macular degeneration. A delay in the onset of age-related macular degeneration by even a few years would significantly lower the prevalence of blindness by allowing many more individuals to complete their lifespan prior to the transition from macular senescence to one or more degenerative diseases.

In the past, sunglasses have customarily been selected and worn primarily for comfort and/or fashion as opposed to use as a medically protective device. As with sunscreens, there is now increasing public awareness of the use of sunglasses to also protect against the harmful effects of sunlight. Unlike the SPF rating system for sunscreens, there has not yet been developed an easy to use, scientifically acceptable, and understandable rating system for sunglasses.

The only generally accepted rating of sunglasses was established by the American National Standards Institute (ANSI) in 1983 which classified sunglasses into one of three broad categories; cosmetic, general purpose and special purpose, according to the filtration/absorption properties of the lens. Labeling of these three categories, however, is voluntary, and unfortunately, provides the consumer with little to no information about the protective value of the product.

There is presently no uniform, or standardized, labeling of sunglasses that provides adequate information to the consumer. Thus, there is a great need for a uniform testing and labeling system that will provide consumers with information about the solar radiation protective properties of sunglasses and other optical lenses.

SUMMARY OF THE INVENTION

It is an object of the present invention to provide a method of measuring the eye protective capability of eyewear and to rate them according to a system that imparts information to consumers.

It is another object of the present invention to provide a method of measuring the eye protective capability of eyewear in the near ultraviolet and blue wavelengths. Further, the method measures the protective capability of the frames, or style. This data is then transformed into a consumer available rating that informs prospective consumers about the protective capability of the eyewear.

It is a further object of the present invention to provide an eyewear rating system that provides to the consumers information about the protective capabilities of eyewear in the near ultraviolet and blue wavelengths and also the protective or light blocking capabilities of the frame or style protection. The rating system preferably uses linear relationships to impart the information to the consumers.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 1 illustrates a possible embodiment of a sticker providing sun protection rating information for three properties according to the present invention;

FIG. 2 illustrates an additional possible embodiment of a sticker providing sun protection rating information for two properties according to the present invention; and FIG. 3 illustrates a further possible embodiment of a sticker giving sun protection rating information for two different properties according to the present invention.

FIG. 4 illustrates a further possible embodiment of a sticker giving sun protection rating information for another two different properties according to the present invention.

DESCRIPTION OF PREFERRED EMBODIMENTS

Referring now to the drawings, and especially to the below description, the present invention is a method of rating eye protection, namely sunglasses. This method provides the user or consumer of the sunglasses with valuable information concerning the value or rating of major protective variables or factors of the sunglasses. The consumer then is able to use this information to make a more informed decision when purchasing sun protection eyewear.

Developing a rating system for sunglasses is problematical. The issues involved are more complex than for skin protection. With the skin, for example, nearly all absorption of sunlight occurs in the pigmented basal epidermal cells (melanocytes), whereas the eye acts more like a series of filters, absorbing different wave lengths of light in its various parts along the pathway from front to back. Also, whereas the carcinogenic effect of sunlight has been largely attributed to UV-B (280 to 320 nanometers), the damage spectrum of sunlight to the eye extends much further, covering the entire UV spectrum and into the shortest wavelengths of the visible spectrum (violet and blue light) as well. Finally, while sunscreen can cover the surface of the skin, sunglasses sit some distance away from the eye's surface and generally allow either scattered or direct sunlight to reach the eye without passing through the filtering sunglass lens. Given these complexities, and ignoring for the moment the environmental, anatomical and physiological differences, present in each condition, it is not reasonable to justify the use of a single number to rate the sun protective value of sunglasses.

The present invention is a rating system that has been developed to incorporate at least two, preferably three, values for each pair of sunglasses. One value is assigned to the long UV spectrum, from 280 to 400 nanometers (UV). A second value is assigned to the shortest wavelength of the visible spectrum, from 400 to 500 nanometers (BLUE). And, the third value is assigned to the quantity of direct or scattered light reaching the eye without passing through the sunglass lens (STYLE). These three factors were selected for evaluation because they are responsible for virtually all of the potential photochemical damage that can occur to the eye under natural sunlight.

In developing a scale for the rating of UV, both the available intensity and toxicity levels of the radiation must be considered. For the UV light spectrum, the availability of any given wavelength of radiation, at the earth's surface, increases in what can be approximated as an exponential function, from the shortest wavelength to the longest wavelength. However, the toxicity of UV radiation to the eye decreases approximately exponentially over the same range of wavelengths. Since, to a first approximation, these two curves vary inversely, the potential for eye damage remains somewhat constant over the frequency range.

The total amount of UV radiation (including UV-B and UV-A; i.e., 280 to 400 nanometers) transmitted through the sunglass lens serves as an appropriate basis for rating the UV protection of sunglasses. In this rating system, percent of light transmission, measured at 5 nm intervals across the near UV spectrum (280 to 400 nm), is averaged, then subtracted from 100 to reach the rating for UV protection. For example, a rating of 0 represents 100% transmission of UV radiation to the eye, while a rating of 100, represents 100% absorption by the lens and 0% transmission to the eye. Therefore, the by looking at the rating, the consumer can determine the potential eye protection in the UV of any rated pair of sunglasses and compare with other rated sunglasses.

In developing a meaningful rating system for BLUE, like the UV, both the available intensity and toxicity levels must be considered. For the blue light spectrum, the availability of any given wavelength of radiation at the earth's surface increases exponentially from the shortest to the longest wavelength. The toxicity of any given wavelength to the eye, however, decreases exponentially over the same range of wavelengths. Since these two value curves change in opposite directions, like the UV curves, a valid argument can be made that the net effect of damage over the entire spectrum of blue light is also relatively constant. Consequently, the total amount of blue light (400 to 500 nanometers) transmitted through the sunglass lens across this spectrum can serve as an appropriate basis for determining a BLUE rating value.

In this system, values are assigned from 0, representing 100% transmission to 100, representing 100% absorption. Percent of light transmission, measured at 5 nm intervals across the blue spectrum (400 to 500 nm), is averaged, then subtracted from 100 to reach the rating value for BLUE. For example, if there were 5% average transmission of BLUE light through the lens from 200 to 500 nanometers, then, the BLUE rating would be 95. If the same lens allowed an average of 30% of blue light to pass through, the BLUE value would then be 70.

The development of the third rating value for STYLE is more empirical and should determine the amount of incident light that reaches the eye from around the sunglass lens and frame; e.g., scattered and reflected light.

In the STYLE rating system according to the present invention, a model of a human head is used and the amount of light available to eyes is standardized. For this purpose, a hemispheric ambient light meter is placed at approximately the same anatomical location as the eye within a polystyrene mannequin's head. In a completely darkened room, 5 diverging light sources of known luminosity (60 watt incandescent bulbs) are placed inside 12 inch round silver reflective canisters and directed toward the mannequin's head from above, below, both sides and directly in front, each light source located at a distance of two meters from the head. According to this model, without any protection, 360-foot candles of light are recorded on the lens meter. This is considered the standard or calibration value.

Each pair of sunglasses is rated relative to this standard by placing them on the head and rendering the lens completely opaque to all light, i.e., by spray painting the lens black. The now available light at the meter is then recorded under the same lighting conditions as the standard. This measurement is repeated at least three times for each tested product to derive an average luminosity recording of the meter.

According to the rating system of the present invention, a linear rating ranging from 0 to 100 is then assigned to the sunglasses for STYLE. A recording of 360 foot candles represents a STYLE rating of 0 and a recording of 0 foot candles represents a STYLE rating of 100. Thus STYLE represents the amount of extraneous light that reaches the eye without being filtered through the lenses or absorbed or reflected by the eyewear frame.

While each one of the above rating systems provides the consumer with additional eye protection information not previously available, various combinations of the ratings provide even more information. The most preferred rating system will contain all three pieces of information: UV, BLUE, and STYLE. The sunglasses rating, once measured for a particular frame and lens combination, may be conveniently placed upon the sunglasses with a removable sticker and should be available to the consumer at the point of sale.

As with sunscreens, the purpose of the sunglasses rating system is to omit from consideration specific environmental, anatomical or physiological conditions such as altitude, skin type or position of the eye within the orbit. Rather, for each set of conditions, the rating value system provides a consumer with useful comparable information about the sun protective qualities of the product, heretofore unavailable. Furthermore, it is not intended to provide any information about other factors considered in purchasing sunglasses such as glare, color distortion, comfort, or fashion.

For outdoor use in the bright sun, sunglasses that absorb 99–100% of the full UV spectrum to 400 nm are recommended. Lenses that reduce the transmission of violet/blue light can provide additional protection for the retina. The visible spectrum should be reduced to a comfortable level to eliminate glare and squinting. Individuals who also wear clear prescription eye wear outdoors should consider using lenses that absorb 99–100% of the UV radiation.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A method of rating eyewear comprising the steps of:
   A. providing eyewear to be rated;
   B. measuring at least two physical properties selected from the group comprising ultraviolet radiation absorption, blue light radiation absorption, and light blocking capabilities;
   C. transforming the at least two of the at least two measured properties into rating values based upon a substantially linear rating system, a single value for each measured property; and
   D. informing a prospective consumer of said rating values.

2. The method of rating eyewear according to claim 1 wherein the step of measuring at least two physical properties further comprises measuring all three physical properties.

3. The method of rating eyewear according to claim 2 wherein the step of transforming the at least two of the measured properties further comprises transforming all three of the measured properties into a rating value.

4. The method of rating eyewear according to claim 3 wherein the step of informing a prospective consumer of said rating values further comprises affixing at least two of the transformed rating values onto the provide eyewear.

5. The method of rating eyewear according to claim 1 wherein the step of measuring at least two physical properties further comprises measuring the ultraviolet radiation absorption and blue light radiation absorption.

6. The method of rating eyewear according to claim 5 wherein the step of transforming the at least two of the measured properties further comprises transforming the ultraviolet radiation absorption and blue light radiation absorption into a rating value.

7. The method of rating eyewear according to claim 6 wherein the step of informing a prospective consumer of said rating values further comprises informing said prospective consumer of the ultraviolet radiation absorption and blue light radiation absorption transformed rating values by affixation of said rating values onto the provided eyewear.

8. The method of rating eyewear according to claim 1 wherein the step of measuring at least two physical properties further comprises measuring the ultraviolet radiation absorption and light blocking capabilities.

9. The method of rating eyewear according to claim 8 wherein the step of transforming the at least two of the measured properties further comprises transforming the ultraviolet radiation absorption and light blocking capabilities into a rating value.

10. The method of rating eyewear according to claim 9 wherein the step of informing a prospective consumer of said rating values further comprises affixing the ultraviolet radiation absorption and light blocking capabilities transformed rating values onto the provide eyewear.

11. The method of rating eyewear according to claim 1 wherein the step of measuring at least two physical properties further comprises measuring the blue light radiation absorption and light blocking capabilities.

12. The method of rating eyewear according to claim 11 wherein the step of transforming the at least two of the measured properties further comprises transforming the blue light radiation absorption and light blocking capabilities into a rating value.

13. The method of rating eyewear according to claim 11 wherein the step of informing a prospective consumer of said rating values further comprises affixing the blue light radiation absorption and light blocking capabilities transformed rating values onto the provide eyewear.

14. A method of rating eyewear comprising the steps of:

A. providing eyewear to be rated;

B. measuring ultraviolet radiation absorption, blue light radiation absorption, and light blocking properties of the provided eyewear;

C. transforming the measured properties into rating values based upon a substantially linear rating system, a single rating value for each measured property; and D. affixing the transformed rating values onto the measured eyewear.

* * * * *